(12) United States Patent
Yoshida (10) Patent No.: US 7,203,843 B2
(45) Date of Patent: Apr. 10, 2007

(54) METHOD AND SYSTEM FOR TRANSFERRING DATA

(75) Inventor: Takeo Yoshida, Nakano-ku (JP)

(73) Assignee: Fuji Xerox Co., Ltd., Tokyo (JP)

( * ) Notice: Subject to any disclaimer, the term of this patent is extended or adjusted under 35 U.S.C. 154(b) by 819 days.

(21) Appl. No.: 10/379,724

(22) Filed: Mar. 6, 2003

(65) Prior Publication Data

US 2003/0208693 A1    Nov. 6, 2003

(30) Foreign Application Priority Data

May 2, 2002    (JP)    .............................. 2002-130809

(51) Int. Cl.
*H04L 29/06*    (2006.01)
(52) U.S. Cl. .................... 713/189; 713/187; 380/255
(58) Field of Classification Search ........ 713/187–194; 380/255
See application file for complete search history.

(56) References Cited

U.S. PATENT DOCUMENTS

2002/0094089 A1*    7/2002    Kamiya et al. ............. 380/279
2004/0193878 A1*    9/2004    Dillinger et al. ........... 713/165

FOREIGN PATENT DOCUMENTS

| DE | 199 41 929 | * | 3/2000 |
|---|---|---|---|
| EP | 0 902 568 | * | 3/1999 |
| EP | 0 989 712 A2 | * | 9/1999 |
| EP | 0993 142 | * | 4/2000 |
| JP | A 10-164028 | | 6/1998 |
| JP | A 11-103290 | | 4/1999 |
| JP | A 2000-115162 | | 4/2000 |
| JP | A 2000-261500 | | 9/2000 |
| KR | 2002-0026547 | | 4/2002 |

* cited by examiner

*Primary Examiner*—Taghi T. Arani
(74) *Attorney, Agent, or Firm*—Oliff & Berridge, PLC (57) ABSTRACT

A system is provided for improving security during data transfer. A transmitter side transfer controller (12) divides data to be transferred into a plurality of pieces, removes a portion of data from each piece and encrypts the piece, and uploads each encrypted piece to different relay servers (22) on the Internet (20). The transmitter side transfer controller (12) also provides a receiver side transfer controller (12) information indicating which piece is uploaded to which relay server (22) using a secure communication protocol. The data of the fragment removed from each piece is transmitted to the receiver side transfer controller (12) separately from the encrypted pieces. The receiver side transfer controller (12) downloads the encrypted pieces each uploaded to the relay server (22), decodes the encrypted pieces, complements the decoded data with the data of the fragment to restore the state before the removal, and assembles the restored pieces to obtain the original data to be transferred.

29 Claims, 8 Drawing Sheets

METHOD AND SYSTEM FOR TRANSFERRING DATA

BACKGROUND OF THE INVENTION

1. Field of the Invention

The present invention relates to a method and a system for transferring data and, in particular, to a technique for securely transferring data.

2. Description of the Related Art

A VPN (Virtual Private Network) is a widely used system for securely transferring data through a public network such as the Internet. In a VPN, an encoder is provided on a transmitter side and a decoder is provided on a receiver side, the transmitter side and the receiver side being connected through a public network. Data is encoded (encrypted) at the transmitter side and transmitted through the public network. The receiver side receives the encoded data and decodes the encoded data to restore the original transmitted data. When a VPN is employed, even if the data being transferred over the public network is intercepted, security is maintained unless the encryption is broken.

In the related art, systems for further improving the security from a simple encrypted communication have been proposed. For example, Japanese Patent Laid-Open Publication No. Hei 11-103290 discloses a system in which encoded information is divided into encryption key information and a data portion and the encryption key information and the data portion are transmitted through different routes. Japanese Patent Laid-Open Publication No. 2000-115162 discloses another system in which encoded information is divided into two data portions using an encryption key as a parameter, the data portions are transmitted through different communication routes, and the receiver side synthesizes and decodes the two data portions using the encryption key. Japanese Patent Laid-Open Publication No. 2000-261500 discloses yet another system wherein original data to be transmitted is divided into a plurality of portion units according to pattern data and the divided portions are transmitted through different communication routes.

With a VPN, because VPN ports at the connection between the user network and the public network must remain open, there is a possibility of intrusion via the VPN ports. For this and other reasons, construction of a VPN is normally limited to the interface between networks in which strong confidence exists, such as between a home office and a branch office of the same company, and a VPN for exchange or communication of data cannot be freely constructed between less strongly related parties.

This problem remains with the systems described in Japanese Patent Laid-Open Publication Nos. Hei 11-103290, 2000-115162, and 2000-261500.

SUMMARY OF THE INVENTION

The present invention was conceived to solve the above described problem and an advantage of the present invention is that a system for transferring data through a public network such as the Internet is provided wherein intrusion to the domain or the device of each user is significantly more difficult than the related art systems. The present invention also advantageously provides a system which enables secure transfer of data via a public network.

According to one aspect of the present invention, there is provided a data transfer method for transferring data from a source device to a destination device, wherein the source device divides data to be transferred into a plurality of pieces, determines, for each piece, a relay region as an upload destination to which the piece is to be uploaded, transmits correspondence information indicating the correspondence between each piece and each upload destination relay region to a destination device of the data to be transferred, and uploads each piece to the corresponding upload destination relay region; and the destination device receives the correspondence information from the source device, downloads, based on the correspondence information, each piece from the relay region to which the piece is uploaded, and integrates downloaded pieces to restore the original data to be transferred.

According to another aspect of the present invention, it is preferable that, in the data transfer method, the correspondence information is transmitted using a communication system different from that for the uploading and downloading of the pieces. Here, "communication using a different communication system" can be realized by using a different communication protocol or using a different physical line. Similarly, a "different communication system" in the claims can be realized by a different communication protocol or by a different physical line.

According to another aspect of the present invention, there is provided a data transmission method for transferring data to a destination device, comprising the steps of dividing data to be transferred into a plurality of pieces; determining, for each piece, a relay region to which the piece is to be uploaded; transmitting, to the destination device, correspondence information indicating the correspondence between each piece and each relay region to which the piece is to be uploaded; and uploading each piece to the determined upload destination relay region.

According to another aspect of the present invention, there is provided a data reception method for receiving data to be transferred which is transferred from a source device, the method comprising the steps of receiving, from the source device, correspondence information indicating a relay region to which each piece constituting the data to be transferred is uploaded; downloading each piece from the relay region to which the piece is uploaded based on the correspondence information; and integrating the downloaded pieces to restore the original data to be transferred.

According to another aspect of the present invention, there is provided a data transfer method for transferring data from a source device to a destination device, wherein the source device divides data to be transferred into a plurality of pieces, removes a fragment of data from each piece, transmits the segment of each piece remaining after the removal process to the destination device, and transmits, to the destination device, the data of the fragment removed from each piece using a communication route different from that for the data of the piece, and the destination device receives the segment of each piece remaining after the cutting process, receives the data of the fragment removed from each piece, restores the remaining segment of each piece to a state before the removing process using the data of the fragment for each piece, and integrates the restored pieces to restore the original data to be transferred.

DESCRIPTION OF PREFERRED EMBODIMENT

A preferred embodiment of the present invention (hereinafter referred to simply as "the embodiment") will now be described with reference to the drawings.

Figure 1:
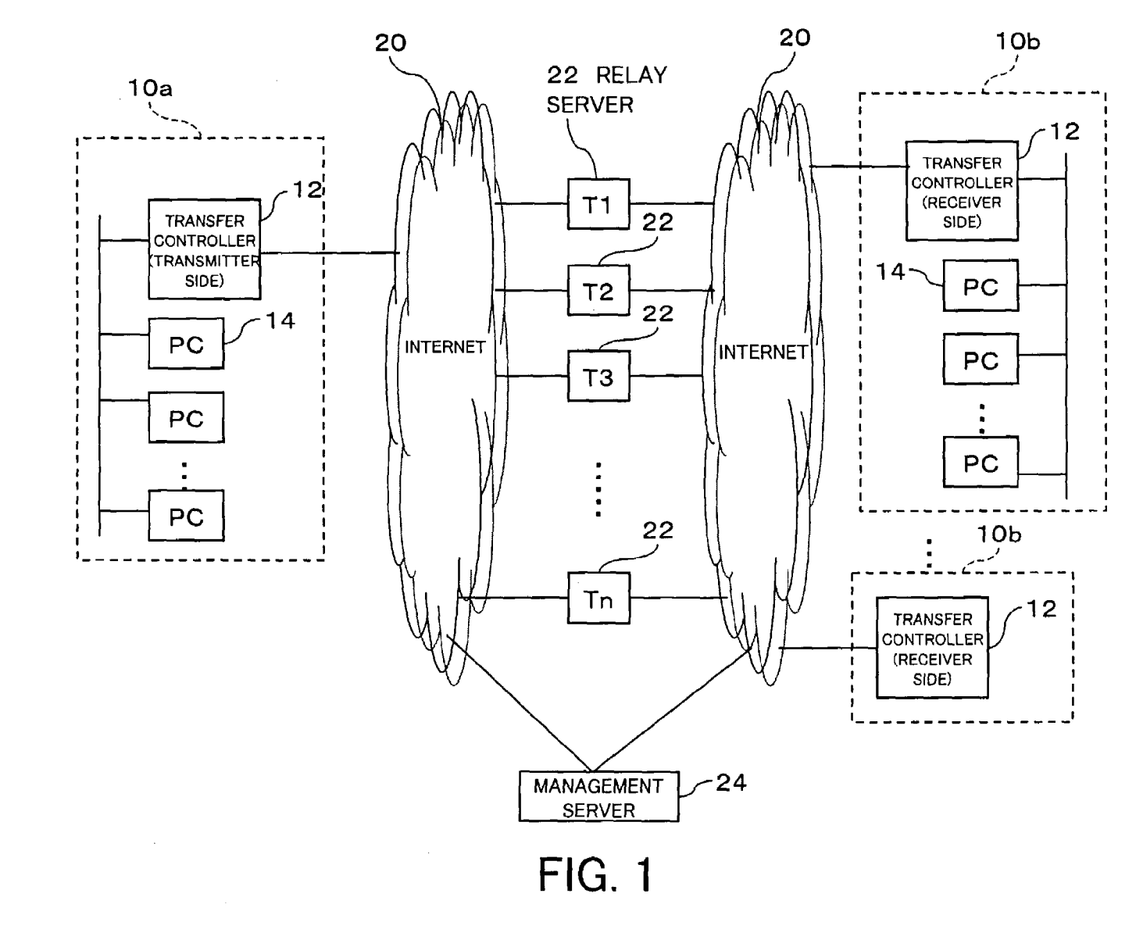
FIG. 1 is a schematic diagram showing a structure of a system for transferring data according to a preferred embodiment of the present invention.

FIG. 1 is a diagram showing an overall structure of a data transfer system according to the present invention. The exemplified system comprises a transfer controller 12 provided on a source domain 10a of data (transmitter side) and a transfer controller 12 provided on each of destination domains 10b (receiver side). It should be noted that as used herein, "domain" refers broadly to a variety of physically or virtually closed networks, and is not limited to domains registered with a national or international authority. Each transfer controller 12 is a server for providing a transmission/reception service of data to client PCs 14 within the same domain 10a or 10b as the transfer controller 12, and is connected to the Internet 20. The client PC 14 transmits or receives data to or from another device via the corresponding transfer controller 12 within the same domain 10a or 10b. The transfer controller 12 may be a simple server on the same LAN (Local Area Network) as the client PCs 14, or, alternatively, may be a gateway for connecting the LAN to the Internet 20.

In the present example of the embodiment, the data source does not directly transmit data to the destination, but uploads the data to one or more of relay servers 22 (T1, T2, ... Tn) present on the Internet 20. Then, transfer of data is achieved by the destination downloading the data uploaded to the relay servers 22. The transfer controllers 12 are provided to execute these upload and download processes.

As the relay server 22, any one of various types of servers which can process a request for uploading data and a request for downloading data such as, for example, an ftp (file transfer protocol) server and an http (hypertext transfer protocol) server can be used. An extremely large number of servers providing data upload and download services are already connected to the Internet, and one of the existing servers can be utilized as the relay server 22.

An administrator managing the data transfer system of the present embodiment is not required to own the relay servers 22 and may rent disk space on an existing ftp server or http server and utilize that disk space as the relay server 22.

Each of the transfer controllers 12 maintains a list of available relay servers 22. When a transfer controller 12 receives a data transmission instruction from a client PC 14, the transfer controller 12 selects one or more relay servers 22 to be used from the list. This list contains information necessary for accessing the relay servers 22 such as the URL (Uniform Resource Locator) of the relay servers 22. Due to addition of a new relay server 22 or abandonment of a relay server 22, the configuration of the group of relay servers 22 available for the transfer controllers 12 may change. In this case, a management server 24 which manages the structure of the data transfer system distributes a new list to the transfer controllers 12 so that the transfer controllers 12 can maintain the most recent information on the available relay servers 22. The distribution of the list in this process is performed using a secure communication protocol such as an SSL (Secure Socket Layer).

In data transfer using this system, first, data to be transmitted by a client PC 14 on the transmitter side is uploaded to one or more relay servers 22 via a transfer controller 12 provided in a domain 10 to which the PC 14 belongs. The transfer controller 12 sends information regarding the relay servers 22 to which the data is uploaded to a transfer controller 12 of a domain 10 to which a destination client PC 14 belongs. A transfer controller 12 on the destination side (receiver side) receiving this information accesses the relay servers 22 indicated by the information and downloads the data uploaded to the relay servers 22. Then, the destination client PC 14 receives the data downloaded to the transfer controller 12 of the domain to which the destination client PC 14 belongs.

Figure 2:
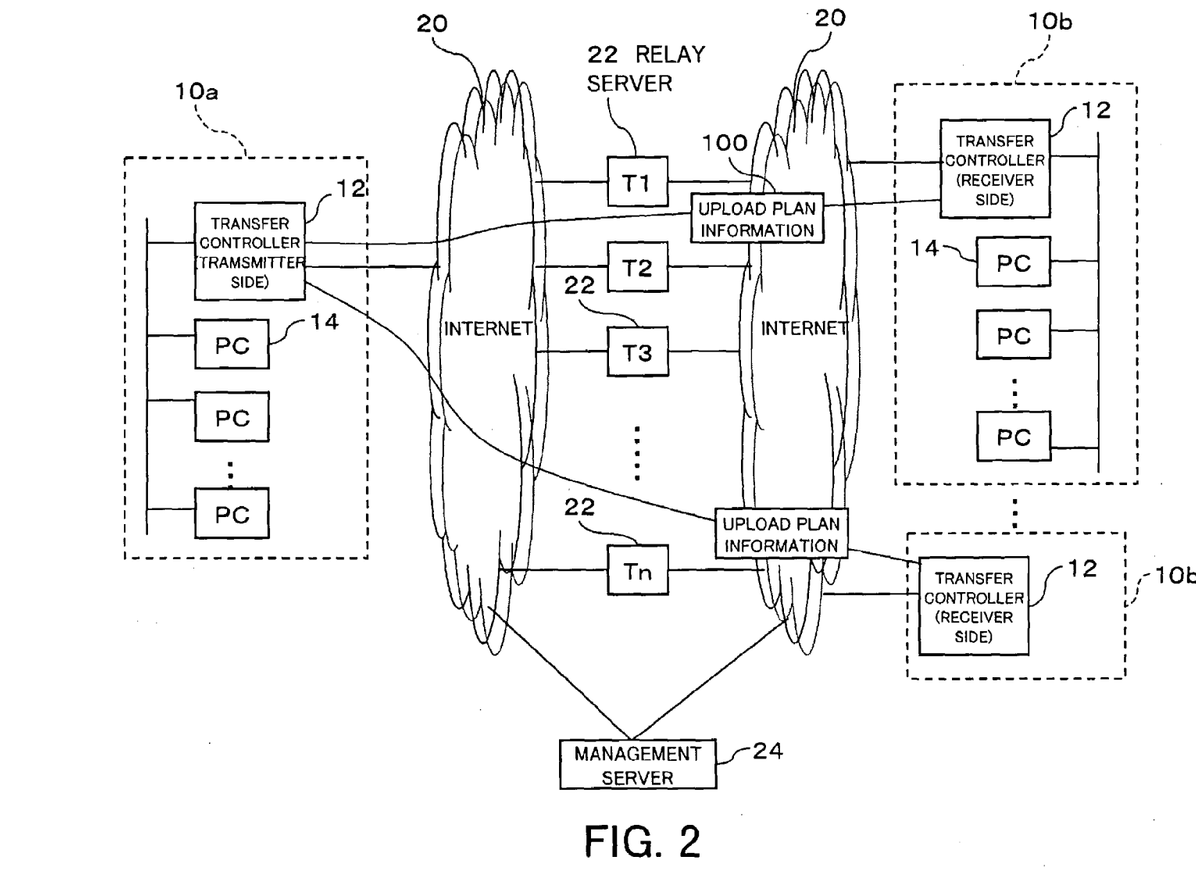
FIG. 2 is a diagram for explaining a process for transmitting upload plan information.
Figure 3:
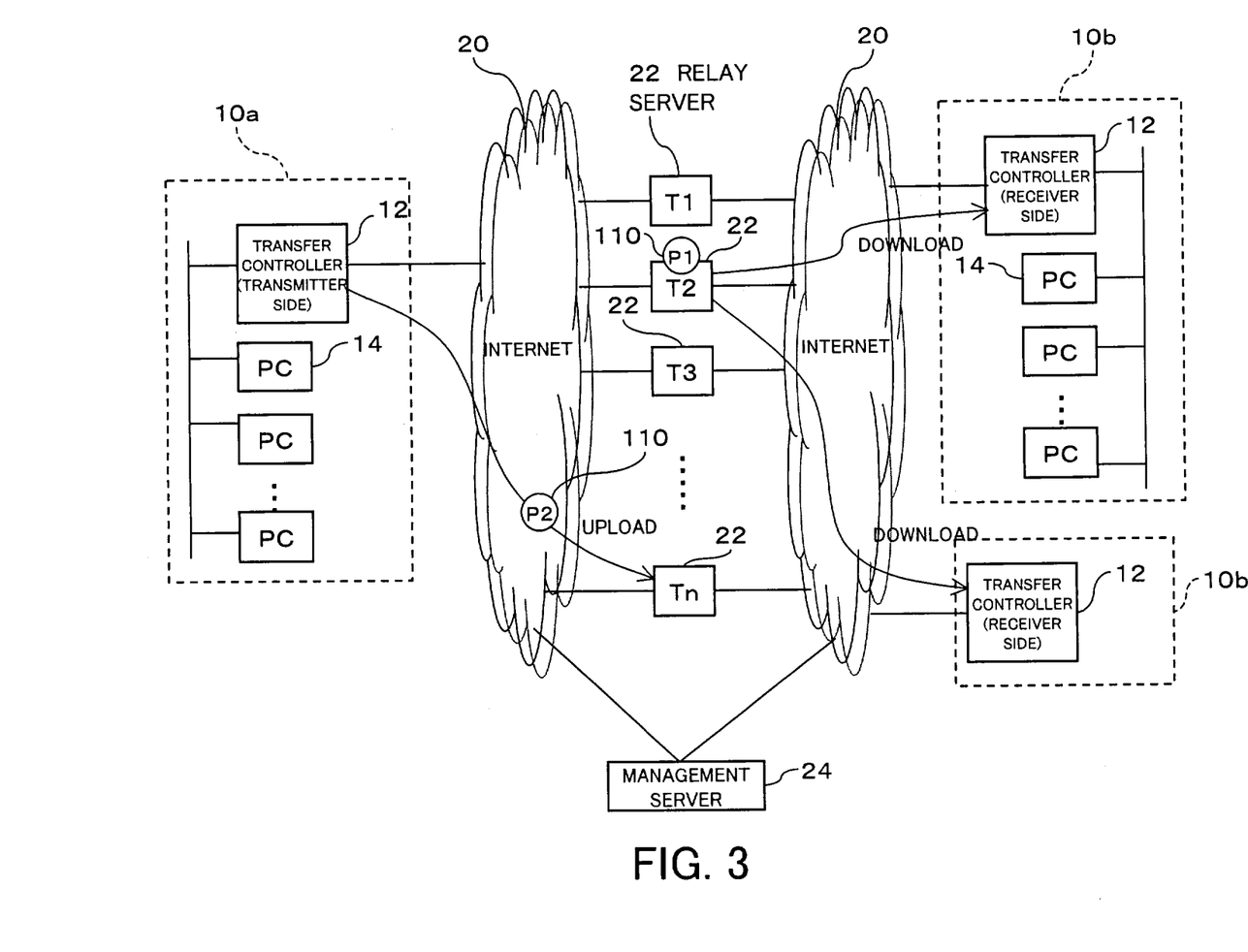
FIG. 3 is a diagram for explaining a process for transferring data.

In addition, in the present embodiment, the data to be transferred is divided into a plurality of segments and the segments are transferred using a plurality of relay servers 22. In this transfer procedure, the transfer controller 12 of the transmitter side first determines which segment, hereinafter referred to as a "piece", is to be uploaded to which relay server 22. Then, as shown in FIG. 2, the transmitter side transfer controller 12 transmits to each of the transfer controller 12 of the destinations (receiver side) upload plan information 100 related to the plan determined by the transfer controller 12, using a secure communication protocol such as SSL. Then, as shown in FIG. 3, the transmitter side transfer controller 12 uploads each piece 110, in order, to the corresponding relay server 22 according to the upload plan. The receiver side transfer controller 12 accesses the relay servers 22 according to the received upload plan information 100, downloads each piece held in each relay server 22, and combines all of the downloaded pieces to restore the original data.

In the present embodiment, in addition to dividing the data to be transmitted into a plurality of pieces, a portion of data is removed from each piece and the data with a portion missing is uploaded to the relay server 22. Therefore, even if an unauthorized party does obtain a piece of the data, they cannot reconstruct the original information from just the obtained piece. The data fragments removed from each piece is provided from the transmitter side transfer controller 12 to the receiver side transfer controller 12 after all of the pieces are downloaded to the receiver side transfer controller 12. Using the received information on the fragments, the receiver side transfer controller 12 can restore the data of each downloaded piece to their original state.

Figure 4:
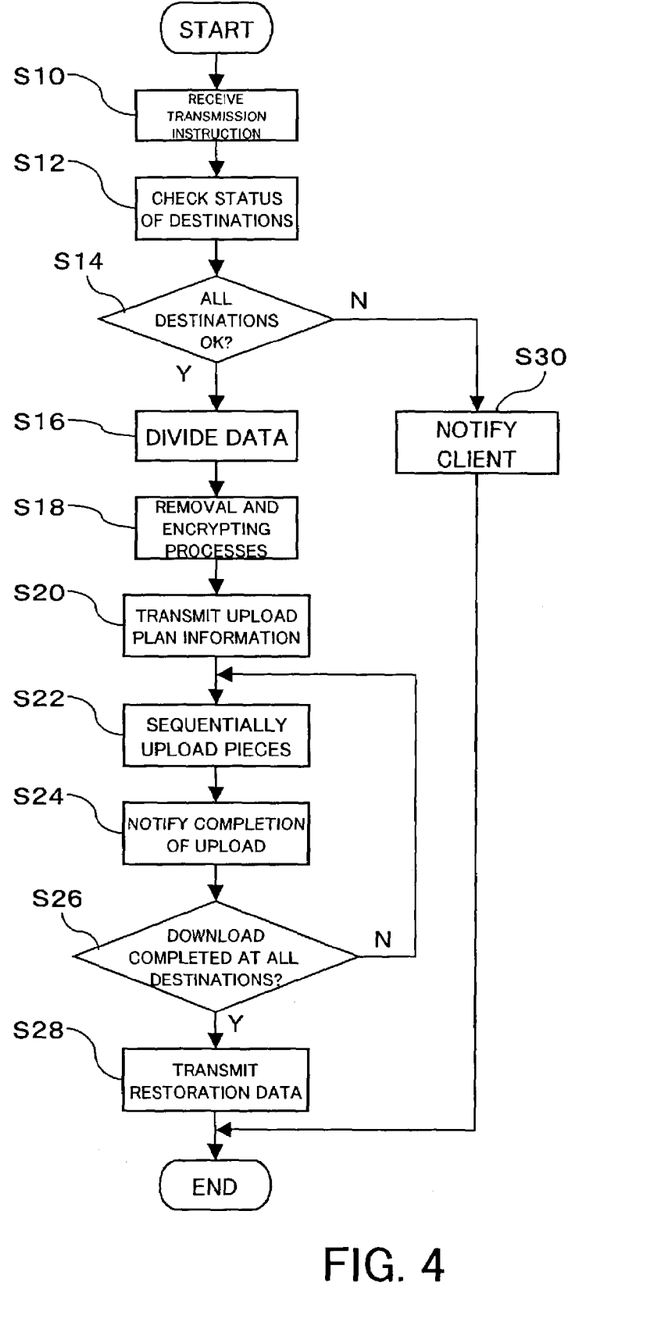
FIG. 4 is a flowchart showing an example procedure of a process of a transfer controller on the transmitter side.
Figure 5:
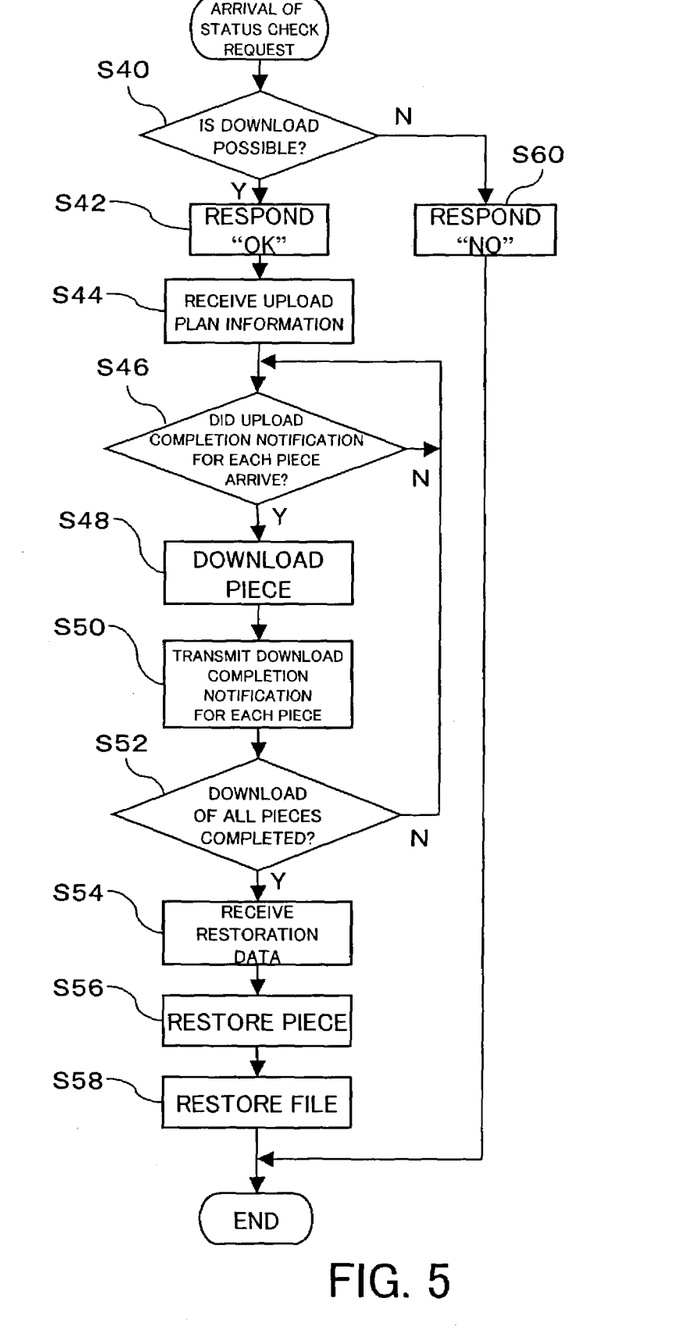
FIG. 5 is a flowchart showing an example procedure of a process of a transfer controller on the receiver side.

Next, the flow of a process for transferring data according to the present embodiment will be described with reference to FIGS. 4 and 5. FIG. 4 shows procedures at a transmitter side transfer controller 12, while FIG. 5 shows procedures at a receiver side transfer controller 12.

Initially, the transmitter side transfer controller 12 receives a data transfer instruction from a client PC 14 located in the same domain (S10). This transfer instruction includes data to be transferred (or address information for obtaining the data) and address information (such as URL or IP address) of one or more destinations of the data. The transmitter side transfer controller 12 receiving this transfer instruction sends an inquiry to transfer controllers 12 of a domain to which each of the designated destinations belongs (receiver side) to ascertain whether or not that transfer controller can receive the data to be transferred (S12). This inquiry includes information such as the amount of data to be transferred.

The receiver side transfer controller 12 receiving this inquiry checks the available disk capacity of the receiver side transfer controller 12 and determines whether or not it is possible to download the data to be transferred (S40). In the present example, another process is required to restore the original data from the received encrypted pieces obtained by dividing the data to be transferred into a plurality of pieces, removing a portion of each piece, and encrypting the restructured data. Therefore, when determining whether or not available disk capacity is sufficient, the receiver side transfer controller 12 consideration also of the work space for this process.

When it is determined at the determination in step S40 that the available disk capacity is insufficient, the receiver side transfer controller 12 sends a response to the transmitter side transfer controller 12 indicating that downloading is not possible (S60). On the other hand, when it is determined that the available disk capacity is sufficient, the receiver side transfer controller 12 sends a response to the transmitter side transfer controller 12 indicating that downloading is possible (S42).

When the transmitter side transfer controller 12 receives responses for the inquiry of step S12 from all of the transfer controllers 12 to which an inquiry was sent, the transmitter side transfer controller 12 first determines whether or not all of the responses are positive (S14). When the transmitter side transfer controller 12 determines that at least one of the response indicates that download is impossible, the transmitter side transfer controller 12 notifies the client PC 14 instructing the transfer (S30) and the process is completed. In this case, at the client PC 14 instructing the transfer, for example, the user sees the notification, quits data transfer to the destination to which transfer is not possible or requests the system administrator of the destination in which download is not possible to free additional disk capacity, and then resends the data transfer instruction.

The procedure shown in step S14 wherein the data is not transferred unless all of the destinations can download the data is given only as an example. Alternatively, for example, it is also possible to employ a procedure in which data transfer is started when at least one of the destinations can download the data.

When it is determined in step S14 that all of the contacted destinations are able to download and store the queried data, the transmitter side transfer controller 12 divides the data to be transferred into a plurality of pieces (S16) and applies a partial removal process and an encryption process to each piece (S18).

Details of an example process of steps S16 and S18 will now be described with reference to FIG. 6. In this process, the transmitter side transfer controller 12 first compresses the data 200 to be transferred using a predetermined data compression algorithm (S100). It is also possible that, in this step, the compression methodology or the compression parameters be dynamically changed. In this case, the transmitter side transfer controller 12 notifies the receiver side transfer controller 12 of information for identifying the compression methodology or parameters.

An MD5 value (Message Digest 5:RFC1321) 202 of the data 200 to be transferred is also generated. The MD5 value 202 is used for determining validity when the data 200 is restored at the receiver side.

Compressed data 205 is divided into m pieces 210 (m is an integer of at least 2) (P1, P2, . . . Pm) (S102). The number of pieces m is determined according to a predetermined algorithm and based on parameters such as the line capacity for the transmitter side transfer controller 12 available for the upload operation at that particular time.

When the connecting line between the transfer controllers 12 and the Internet 20 provides asymmetric line speed (rate) for uploading and downloading, such as ADSL (Asymmetric Digital Subscriber Line), for example, it is preferable to divide the data into pieces having as small a size as possible. In the case of ADSL, because the rate for uploading is slower, by dividing the data into smaller pieces, the start of download at the receiver side can be hastened, allowing for faster completion of the overall downloading process.

A partial data fragment 212 is then removed from each of the divided pieces 210 (P1, P2, . . . Pm) (S104). The data fragments 212 removed from the pieces 210 are arranged in an order corresponding to the order of the original pieces and are collected as fragment data 230.

Next, the transmitter side transfer controller 12 applies a data compression process and an encryption process to the pieces 215 (P1', P2', . . . Pm') from which a portion was removed (these pieces will be referred to as "remaining segments" hereinafter) of step S104 (S106). The encrypted pieces 220 generated as the result of this process (P1", P2", . . . Pm") will be uploaded to the relay servers 22. The transfer controller 12 also generates an MD5 value 225 for each encrypted piece 220. A compression process and an encryption process are also applied to the fragment data 230. The encrypted data 235 (Px) obtained as a result of this process is transmitted to the destination after the completion of the downloading of all of the m encrypted pieces 220 by the receiver side transfer controller 12 has been confirmed.

Here, if the location and size of the fragment to be removed is fixed in the fragment removal (partial cutting) process of the pieces at step S104, restoration of the piece at the receiver side is simplified, but this configuration also results in weaker security. Therefore, it may also be preferable to change the methodology for the fragment removal process (change the location or size of the fragment to be removed, for example) each time data is transferred. In such a case, information identifying the methodology for fragment removal must be sent to the receiver side transfer controller 12 by some means. In the simplest possible method, information indicating the employed methodology can simply be transmitted from the transmitter side transfer controller 12 to the receiver side transfer controller 12. In the present embodiment, however, in order to provide a more secure method, the algorithm for determining methodology for removal process is provided to the transmitter side transfer controller 12 and to the receiver side transfer controller 12. Then, by applying attribute values such as transmission time or data to be transmitted (or parameter values derived from these attribute values) to the methodology determination algorithm, the appropriate methodology for the removal process is determined and applied. Because the receiver side transfer controller 12 can also obtain these attribute values, the receiver side transfer controller 12 can identify the methodology for the cutting process without the transmitter side transmitting information indicating the methodology, and can restore the partially missing piece using the identified methodology.

Figure 7:
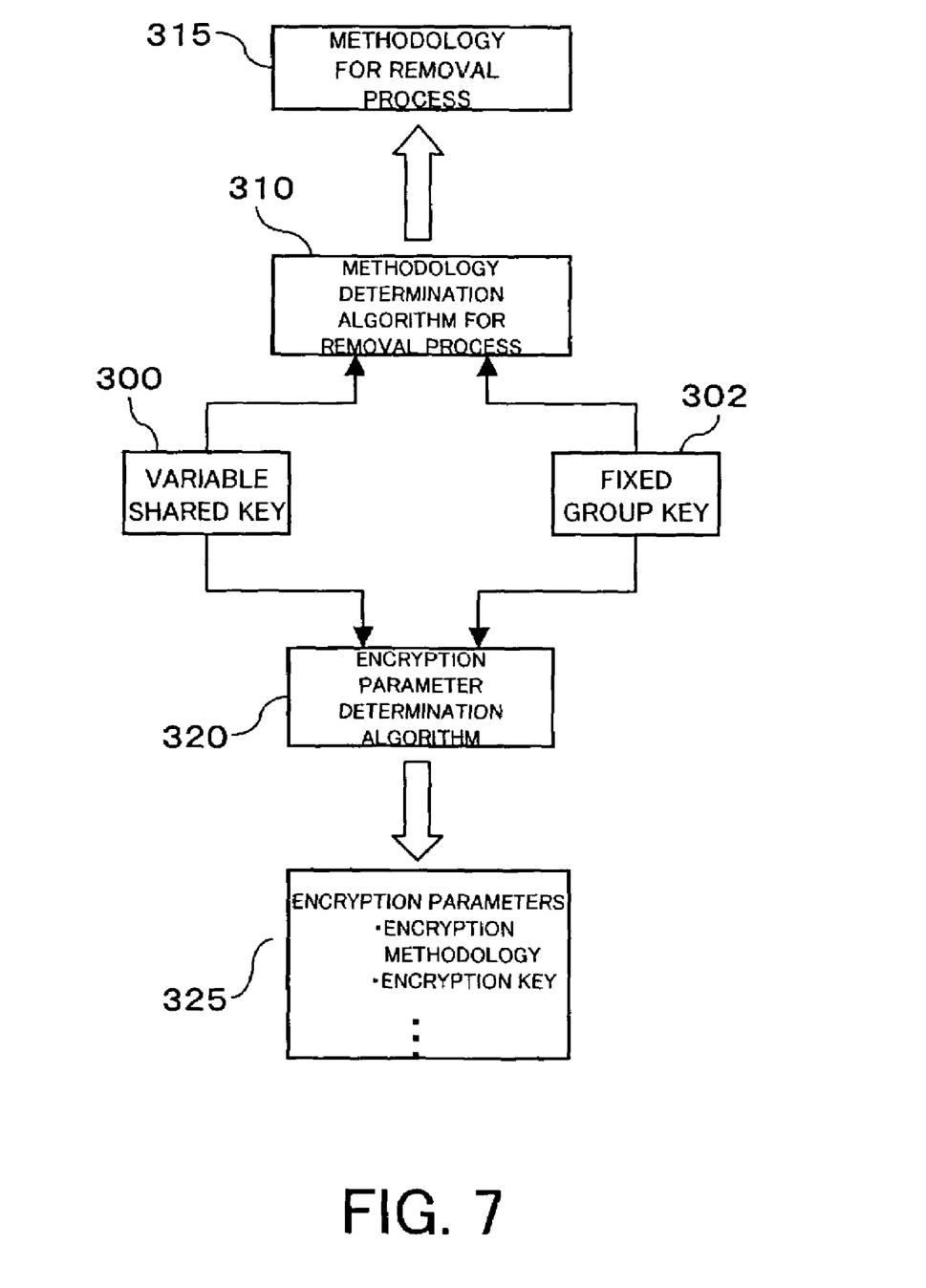
FIG. 7 is a diagram for explaining an example method for determining a methodology for a removing process and encryption parameters.

An example method for determining the methodology for the cutting process is shown in FIG. 7. In this method, a methodology 315 for the removal process corresponding to a combination of a variable shared key 300 and a fixed group key 302 is determined using an algorithm 310 for determining a methodology for the removal process. The variable shared key 300 is shared by all of the transfer controllers 12 connected to the Internet 20 and has a value which changes with time. The variable shared key 300 is distributed to the transfer controllers 12 from the management server 24 using a secure communication protocol. The management server 24 may, for example, periodically change the value of the variable shared key and distribute the new key to the transfer controllers 12. The fixed group key 302 is fixed key information shared within a group wherein data is transferred using the system of the present embodiment. In the present example of the embodiment, a group within which data is transferred can beset among a plurality of users for which transfer controllers 12 are provided. The fixed group key 302 is then the common key information used within this group. The fixed group key 302 is determined by the user who established the group and is transmitted to the transfer controllers 12 for the other users within the group using a secure communication protocol. By combining the variable shared key 300 and the fixed group key 302, information which can be understood only by the members of the group and which changes with time can be obtained. Therefore, by supplying this information to the determination algorithm of the methodology for the removal process, it is possible to determine the same methodology at the transmitter side and at the receiver side. Determining the methodology in this manner, makes it more difficult for an outsider to determine the methodology. Also, although in the above description, a process is exemplified in which the methodology for the removal process is determined using a variable shared key 300 and a fixed group key 302, the present embodiment is not limited to such a configuration and it is also possible to additionally consider characteristic values (for example, the MD5 value 205) derived from the data 200 to be transferred so that the methodology will be different for each data 200 to be transferred.

In the above, an example process for changing a methodology for the removal process for each job for transferring data 200 to be transferred is described. With a similar concept, it is also possible to change the methodology for the fragment removal process for each piece in a single data transfer job.

In the above, an example process for dynamically changing the methodology of the removal process is described. The encryption methodology, the encryption keys, etc. for encryption in the compression and encryption process may also be dynamically changed in a similar manner. More specifically, in the example of the present embodiment shown in FIG. 7, a common algorithm 320 for determining encryption parameters is provided to both the transmitter side transfer controller 12 and the receiver side transfer controller 12, and the encryption parameters 325 such as the encryption methodology and encryption key used for encryption of the pieces for this time are determined by the algorithm 320 based on a variable shared key 300 and a fixed group key 302. By also considering characteristic values (such as the MD5 value 205) of the data 200 to be transferred in the determination of the encryption parameters 325, it is also possible to change the encryption parameters for each data 200 to be transferred. In the above description, an example method for changing the encryption parameters for each job to transfer data 200 to be transferred is described, but the present embodiment is not limited to such a configuration and it is also possible to change the encryption parameters for each piece in a single data transfer job in a similar manner.

Referring again to FIGS. 4 and 5, when the division process of data (S16) and partial cutting and encryption process (S18) are completed, the transmitter side transfer controller 12 creates a plan indicating which relay server 20 each of the encrypted pieces 220 is to be uploaded, and transmits upload plan information 100 outlining the plan to each of the destination transfer controllers 12 using a secure protocol (S20).

To prepare the upload plan, an upload destination for each encrypted piece 220 is selected from a list of available relay servers 22. In this process, it is possible to select the same relay server 22 as the upload destination of a plurality of pieces 220, but it is ensured that not all of the upload destinations of the encrypted pieces 220 become identical. It is also possible to determine the number of relay servers 22 selected in this process in consideration of size of the data 200 to be transferred, or other factors.

Figure 8:
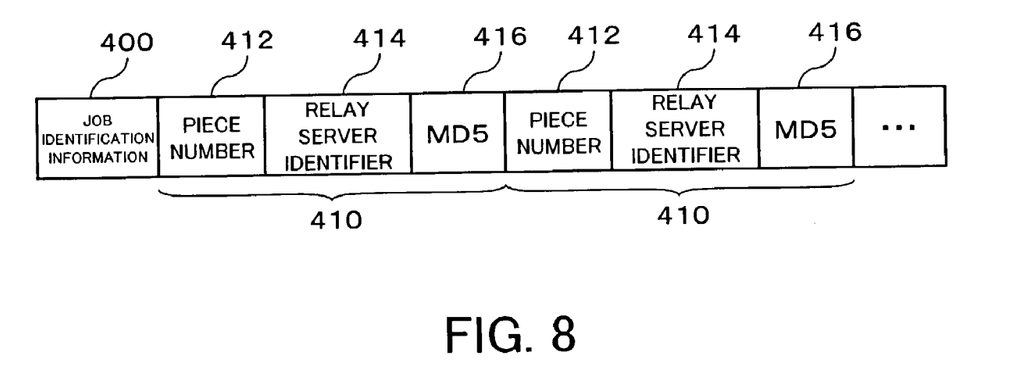
FIG. 8 is a diagram showing an example content of data in upload plan information.

As shown in FIG. 8, the upload plan information 100 includes job identification information 400 which indicates the current data transfer job and piece information 410 for each piece. Each piece information 410 includes a piece number 412, a relay server identifier 414, and an MD5 value 416. The piece number 412 is a serial number unique to the piece within a transfer processing job of data 200 to be transferred. The relay server identifier 414 is an identifier for the relay server 22 selected as the upload destination for the piece. The MD5 value 416 is the MD5 value 225 of the encrypted piece 220.

After the upload plan information 100 is transmitted, the transmitter side transfer controller 12 sequentially uploads each of the encrypted pieces 220 to the corresponding relay server 22 according to the upload plan information 100 (S22). Upon completion of uploading of each piece, the transmitter side transfer controller 12 transmits a notification of completion of upload to each of the transfer controllers 12 of the destinations (receiver side) (S24). The completion notification includes the piece number of the piece which has been uploaded.

Each of the receiver side transfer controllers 12 receives the upload plan information 100 from the transmitter side transfer controller 12 (S44) and awaits the upload completion notification for each piece to arrive from the transmitter side transfer controller 12 (S46). As the receiver side transfer controller 12 receives the upload completion notification for each piece, the receiver side transfer controller 12 identifies the relay server 22 corresponding to the piece number contained in the notification by referring to the upload plan information 100 and downloads the identified piece (encrypted piece 220) from the relay server 22 (S48). During this process, the receiver side transfer controller 12 calculates the MD5 value for the downloaded encrypted piece 220 and compares this MD5 value with the MD5 value 416 indicated in the upload plan information 100 so that the receiver side transfer controller 12 can determine whether or not the downloaded data is valid. When the download of the piece is completed, the receiver side transfer controller 12 transmits a notification of completion of download to the transmitter side transfer controller 12. The download completion notification includes the identification information of the receiver side transfer controller 12 and the piece number of the piece for which the download process has been completed (S50).

The transmitter side transfer controller 12 maintains a download management table for recording which piece each of the destination transfer controllers 12 already downloaded. Every time the transmitter side transfer controller 12 receives a download completion notification, the transmitter side transfer controller 12 records completion information indicating the transfer controller 12 and the piece indicated in the completion notification.

In this upload operation, when the transmitter side transfer controller 12 confirms that one of the encrypted pieces 220 is downloaded by all of the destination transfer controllers 12, the transmitter side transfer controller 12 transmits a deletion request for that piece 220 to the relay server 22 to which the piece 220 was uploaded. In this manner, it is possible to prevent data remaining in the relay servers 22 any longer than necessary. In addition, for preventing long storage of data in the relay servers 22, it is also preferable to delete the piece from the relay server 22 after a predetermined time has elapsed, even if not all of the destination transfer controllers 12 has completed downloading of the piece 220. As many of the relay servers 22 are configured such that uploaded data is automatically deleted after a predetermined time is elapsed after the upload, the uploaded piece 220 may be deleted by this function of the relay server 22.

The transmitter side transfer controller 12 repeats steps S22 and S24 until the receiver side transfer controllers 12 complete downloading of all of the encrypted pieces 220 of the data 200 to be transferred (S26).

Figure 9:
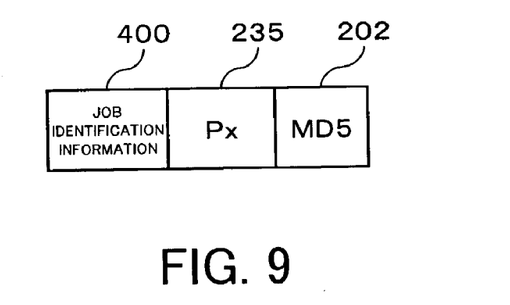
FIG. 9 is a diagram showing an example content of data in restoration information.

When the transmitter side transfer controller 12 confirms that a receiver side transfer controller 12 has completed downloading of all of the encrypted pieces 220, the transmitter side transfer controller 12 transmits restoration data to the receiver side transfer controller 12 (S28). As shown in FIG. 9. the restoration data transmitted in this process includes the job identifier information 400 indicating the current data transfer job, the encrypted data 235 (Px) obtained by compressing and encrypting the fragment data 230, and the MD5 value 202 for the original data 200 to be transferred (refer also to FIG. 6). The transmission of the restoration data may be executed using an already-existing secure communication protocol such as SSL or may be via a relay server 22 similar to the transfer of the encrypted pieces 220.

When a plurality of receiver side transfer controllers 12 are available, it is possible to transmit the restoration data when all of the receiver side transfer controllers 12 have completed downloading of all of the pieces, or to transmit the restoration data individually to each receiver side transfer controller 12 when that particular receiver side transfer controller 12 has completed downloading of all of the pieces.

When the receiver side transfer controller 12 completes download of all of the pieces (S52), the receiver side transfer controller 12 receives the restoration data sent from the transmitter side transfer controller 12 (S54). The receiver side transfer controller 12 applies a process to restore the pieces removed at step S104 and reverse the compression and encryption processes of step S106 based on each of the downloaded encryption pieces 220 and the restoration data, to restore the pieces (S56). More specifically, in this restoration process, first, the encrypted piece 220 is decoded and the original piece 210 is restored by reintegrating the appropriate fragment into the restored encrypted piece. As described above, the receiver side can perform the restoration process because it is able to identify the methodology for the removal process and the encryption parameters selected by the transmitter side. When restoration of all of the pieces is complete, a process to reverse the data division of step S102 is applied to restore the compressed data 205, and then a decompression process inversely corresponding to the data compression of step S100 is applied to restore the original data 200 (S58). Then, the receiver side transfer controller 12 calculates the MD5 value of the restored data 200, compares the calculated MD5 value with the MD5 value 202 contained in the restoration data, and confirms the validity of the data 200 when these MD5 values coincide with each other.

Alternatively, the compression methodology and the parameters for the compression algorithm employed in the data compression process of step S100 may be dynamically changed. In such a case, the receiver side transfer controllers 12 must be able to identify the methodology and parameters used for the compression. This can be accomplished by configuring the system so that the transmitter side transfer controller 12 transmits information indicating the methodology and parameters for compression to the receiver side transfer controllers 12. Alternatively, it is also possible to employ a method similar to the method for the methodology for the removal process and encryption parameters to enable the receiver side to identify the methodology and parameters for compression used by the transmitter side.

The transferred data 200 restored in this manner is supplied from the receiver side transfer controller 12 to each of the transfer destination client PCs 14 within the domain to which the transfer controller 12 is located. In this process, it is possible to employ, for example, a procedure in which the receiver side transfer controller 12 notifies the destination client PCs 14 that the data has been transferred and the client PCs 14 download the data from the transfer controller 12 in response to the notification.

With the above processes, it is possible to assure and accomplish secure transfer of data.

In some cases, in the upload operation of step S22, some of the relay servers 22 indicated in the upload plan information 100 maybe unavailable for some reason. In such a case, the transmitter side transfer controller 12 selects another relay server 22, uploads the encrypted piece 220 to the selected relay server 22, and sends identification information of the selected upload destination relay server 22 to the receiver side transfer controllers 12 in the upload completion notification of step S24. With this configuration, even when a relay server 22 which is different from that in the original plan is selected, the receiver side transfer controllers 12 is still able to download the encrypted piece 220 using the newly selected relay server 22.

In addition, in some cases, when a plurality of destination transfer controllers 12 are available, some of the destination transfer controllers 12 may be unable to download some pieces because of, for example, malfunctions in communication line or equipment failure. In such a case, the transmitter side transfer controller 12 again uploads (re-uploads) the encrypted pieces 220 for which downloading has not been completed and sends a notification to each destination transfer controller 12 which has not completed downloading of that piece 220. It is preferable that this re-uploading process be performed after uploading of all of the pieces is first completed according to the upload plan information 100. With such a configuration, it is possible to provide the restoration data to the destinations in which download of all of the pieces is completed regardless of the destinations in which download is not completed, allowing for a faster completion of data transfer.

As described, according to the present embodiment, each of the transfer controllers 12 is required to connect to the relay server 22 only when the transfer controller 12 is to upload or download data. Because of this, it is possible to significantly reduce the risk of intrusion compared to conventional VPN in which the communication ports must remain open at all times.

Moreover, according to the present embodiment, because the relay servers 22 to be used for relay of data transfer are dynamically selected each time data is transferred, it is possible to reduce the possibility of intentional interception of data being transferred. Furthermore, because, according to the present embodiment, the data to be transferred is divided into a plurality of pieces, a relay server 22 is individually selected for each piece, and the piece is uploaded, it is possible to greatly reduce the risk of interception of the entirety of the data to be transferred.

In addition, according to the present embodiment, because a fragment of the data in each piece is removed and the remaining segment is transferred, even if the data of the piece is intercepted during transfer, it is possible to prevent the interceptor to know the data content of the original piece. A combination of the partial data removal process and an encryption process results in a configuration wherein interception of the data of the piece being transferred will not result in a leak of any meaningful data.

Figure 6:
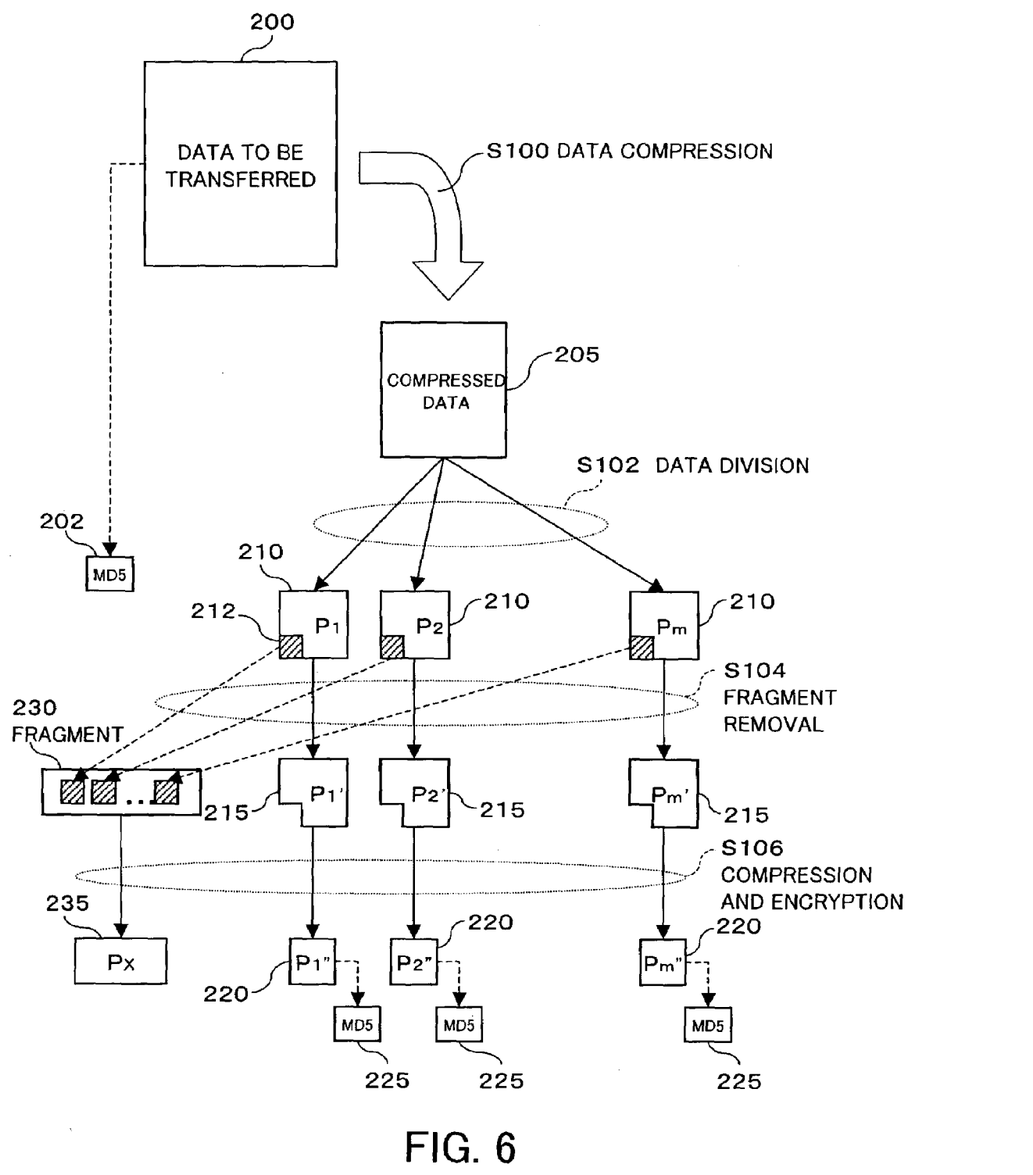
FIG. 6 is a flowchart showing an example of division and encryption of data to be transferred.

The division, compression, and encryption processes of data 200 to be transferred shown in FIG. 6 is only an example. The present invention is not limited to such a configuration and any of other various types of processes may be used. For example, it is possible to employ a procedure wherein the data 200 to be transferred is compressed and encrypted, the encrypted data is divided into a plurality of pieces, a fragment of each piece is removed, and the remaining segments are transferred.

The above description of the preferred embodiment is provided to for exemplifying purpose only and should not be interpreted as limiting the present invention in any way. It should be understood that various changes and modifications can be made by a person with ordinary skill in the art within the scope and spirit of the present invention defined in the claims.

What is claimed is:

1. A data transfer method for transferring data from a source device to a destination device, wherein
   the source device divides data to be transferred into a plurality of pieces, determines, for each piece, a relay region to which the piece is to be uploaded, transmits correspondence information indicating the correspondence between each piece and each upload destination relay region to a destination device of the data to be transferred, and uploads each piece to the corresponding upload destination relay region; and
   the destination device receives the correspondence information from the source device, downloads, based on the correspondence information, each piece from the relay region to which the piece is uploaded, and integrates downloaded pieces to restore the original data to be transferred.

2. A data transfer method according to claim 1, wherein the correspondence information is transmitted using a communication system different from that for the uploading and downloading of the pieces.

3. A data transfer method according to claim 1, wherein
   the source device divides the data to be transferred into a plurality of pieces, removes a fragment of data from each piece, uploads the remaining segment to a corresponding relay region, and transmits data of the fragment for each piece to the destination device using a communication system different from that for the uploading of the pieces, and
   the destination device receives the data of the fragment for each piece, uses the fragment data to restore each piece downloaded from the relay region to a state having no missing portion, and integrates the pieces.

4. A data transfer method according to claim 3, wherein
   the source device selects a methodology for the removal process for removing a fragment of data from each of the pieces based on a methodology determination algorithm common to the source and destination devices, and
   the destination device identifies the methodology for the removal process applied to each piece based on the methodology determination algorithm and restores each piece based on the identified methodology.

5. A data transfer method according to claim 3, wherein
   the source device transmits the data of the fragments to the destination device when the source device detects completion of downloading of all of the pieces constituting the data to be transferred by the destination device.

6. A data transfer method according to claim 1, wherein
   the source device determines encryption parameters corresponding to each piece based on an encryption parameter determination algorithm common to the source and destination devices, encrypts each piece using the determined encryption parameters, and uploads each encrypted piece to the corresponding relay region, and
   the destination device identifies the encryption parameters for each piece based on the encryption parameter determination algorithm and decodes each piece based on the identified encryption parameters.

7. A data transmission method for transferring data to a destination device, comprising the steps of:
   dividing data to be transferred into a plurality of pieces;
   determining, for each piece, a relay region to which the piece is to be uploaded;
   transmitting, to the destination device, correspondence information indicating the correspondence between each piece and each relay region to which the piece is to be uploaded; and
   uploading each piece to the determined upload destination relay region.

8. A data transmission method according to claim 7, further comprising the steps of:
   removing a fragment of data from each piece after the data to be transferred is divided into a plurality of pieces and uploading the remaining segment to the corresponding relay region; and
   transmitting, to the destination device, data of the fragment for each piece using a communication system different from that for the uploading of the pieces.

9. A data transmission method according to claim 8, wherein
   the source device transmits the data of the fragment to the destination device when the source device detects completion of downloading of all of the pieces constituting the data to be transferred by the destination device.

10. A data reception method for receiving data to be transferred which is transferred from a source device, the method comprising the steps of:

receiving, from the source device, correspondence information indicating a relay region to which each piece constituting the data to be transferred is uploaded;

downloading each piece from the relay region to which the piece is uploaded based on the correspondence information; and integrating the downloaded pieces to restore the original data to be transferred.

11. A data reception method according to claim 10, further comprising the steps of:

receiving, from the source device, data of the fragment for each piece; and integrating the pieces downloaded from the relay regions after restoring the pieces to a state having no missing portion using the fragment data.

12. A data transfer system for transferring data from a source device to a destination device, wherein the source device comprises dividing means for dividing data to be transferred into a plurality of pieces, upload destination determining means for determining, for each piece, a relay region as an upload destination to which the piece is to be uploaded, correspondence information transmitting means for transmitting, to the destination device of the data to be transferred, correspondence information indicating each piece and the upload destination relay region of the piece, and uploading means for uploading each piece to the determined upload destination relay region, and the destination device comprises correspondence information receiving means for receiving the correspondence information from the source device, downloading means for downloading each piece from the relay region to which the piece is uploaded based on the received correspondence information, and restoring means for integrating the downloaded pieces and restoring the original data to be transferred.

13. A data transfer system according to claim 12, wherein the correspondence information is transmitted using a communication system different from that for the uploading and downloading of the pieces.

14. A data transfer system according to claim 12, wherein the source device removes a fragment of data from each piece after the data to be transferred is divided into a plurality of pieces, uploads the remaining segment to the corresponding relay region, and transmits, to the destination device, data of the fragment for each piece using a communication system different from that for the uploading of each piece, and the destination device receives the data of the fragment for each piece, uses the fragment data to restore each piece downloaded from the relay region to a state having no missing portion, and integrates the pieces.

15. A data transfer system according to claim 14, wherein the source device selects a methodology for the process of removing data from each piece according to a methodology determination algorithm which is common to the source and destination devices, and the destination device identifies the methodology for the removal process applied to each piece according to the methodology determination algorithm and restores each piece based on the identified methodology.

16. A data transfer system according to claim 14, wherein the source device transmits the data of the fragment to the destination device when the source device detects completion of downloading of all of the pieces constituting the data to be transferred by the destination device.

17. A data transfer system according to claim 12, wherein the source device determines encryption parameters corresponding to each piece based on an encryption parameter determination algorithm common to the source and destination devices, encrypts each piece using the determined encryption parameters, and uploads the encrypted piece to the corresponding relay region, and the destination device identifies the encryption parameters for each piece based on the encryption parameter determination algorithm and decodes each piece based on the identified encryption parameters.

18. A data transmitter for transmitting data to a destination device, the transmitter comprising:

dividing means for dividing data to be transferred into a plurality of pieces;

upload destination determining means for determining, for each piece, a relay region as an upload destination to which the piece is to be uploaded;

correspondence notifying means for transmitting, to the destination device of the data to be transferred, correspondence information indicating the correspondence between each piece and the upload destination relay region for the piece; and uploading means for uploading each piece to the determined upload destination relay region.

19. A data transmitter according to claim 18, wherein the correspondence information notifying means establishes a secure communication system with the destination device and transmits the correspondence information via the secure communication system.

20. A data transmitter according to claim 19, wherein the uploading means comprises:

fragment removal means for removing a fragment of data from each piece after the data to be transferred is divided into a plurality of pieces and uploading the remaining segment to the corresponding relay region; and fragment transmitting means for transmitting, to the destination device, the data of the fragment removed from the piece through a communication system other than that used for uploading the piece.

21. A data transmitter according to claim 20, wherein the fragment transmitting means transmits the data of the fragment to the destination device when the data transmitter detects completion of downloading of all of the pieces constituting the data to be transferred by the destination device.

22. A data receiver for receiving data to be transferred which is transferred from a source device, the receiver comprising:

correspondence information receiving means for receiving, from the source device, correspondence information indicating a relay region to which each of the pieces constituting the data to be transferred is uploaded;

downloading means for downloading each piece from the relay region to which the piece is uploaded based on the correspondence information; and restoring means for integrating the downloaded pieces and restoring the original data to be transferred.

23. A data receiver according to claim 22, further comprising;

fragment receiving means for receiving, from the source device, data of fragments removed from each piece, wherein the restoring means integrates the pieces after using the data of the fragment received by the fragment receiving means to restore each piece downloaded from the relay region to a state having no missing portion.

24. A data transfer method for transferring data from a source device to a destination device, wherein
the source device divides data to be transferred into a plurality of pieces, removes a fragment of data from each piece, transmits the segment of each piece remaining after the removal process to the destination device, and transmits, to the destination device, the data of the fragment removed from each piece using a communication system other than that used for the data of the piece, and
the destination device receives the remaining segment of each piece after the removal process, receives the data of the fragment removed from each piece, restores the remaining segment of each piece to a state before the removal process using the data of the fragment for each piece, and integrates the restored pieces to restore the original data to be transferred.

25. A data transfer method according to claim 24, wherein
the source device selects a methodology for the process used for removing data from each piece according to a methodology determination algorithm which is common to the source and destination devices, and
the destination device identifies the methodology for the removal process applied to each piece according to the methodology determination algorithm and restores each piece according to the identified methodology.

26. A data transfer method according to claim 24, wherein
the source device transmits the data of the fragment to the destination device when the source device detects completion of downloading of all of the pieces constituting the data to be transferred by the destination device.

27. A data transfer system for transferring data from a source device to a destination device, wherein
the source device comprises dividing means for dividing data to be transferred into a plurality of pieces, fragment removal means for removing a fragment of data from each piece, piece transmitting means for transmitting to the destination the segment of each piece remaining after the removal process, and fragment transmitting means for transmitting the data of the fragment removed from each piece to the destination device using a communication system other than that used for transmitting the data of each piece, and
the destination device comprises piece receiving means for receiving the remaining segment of each piece, fragment receiving means for receiving the data of the fragment from each piece, piece restoring means for using the fragment data for each piece to restore the remaining segment to a state before the removal process, and data restoring means for integrating the restored pieces to restore the original data to be transferred.

28. A data transfer system according to claim 27, wherein
the partial removal means of the source device selects a methodology for the removal process according to a methodology determination algorithm common to the source and the destination, and
the piece restoring means of the destination device identifies the methodology for the removal process applied to each piece according to the methodology determination algorithm and restores each piece according to the identified methodology.

29. A data transfer system according to claim 27, wherein
the fragment transmitting means of the source device transmits the data of the fragment to the destination device when the source device detects completion of downloading of all of the pieces constituting the data to be transferred by the destination.

* * * * *